Figure 4:
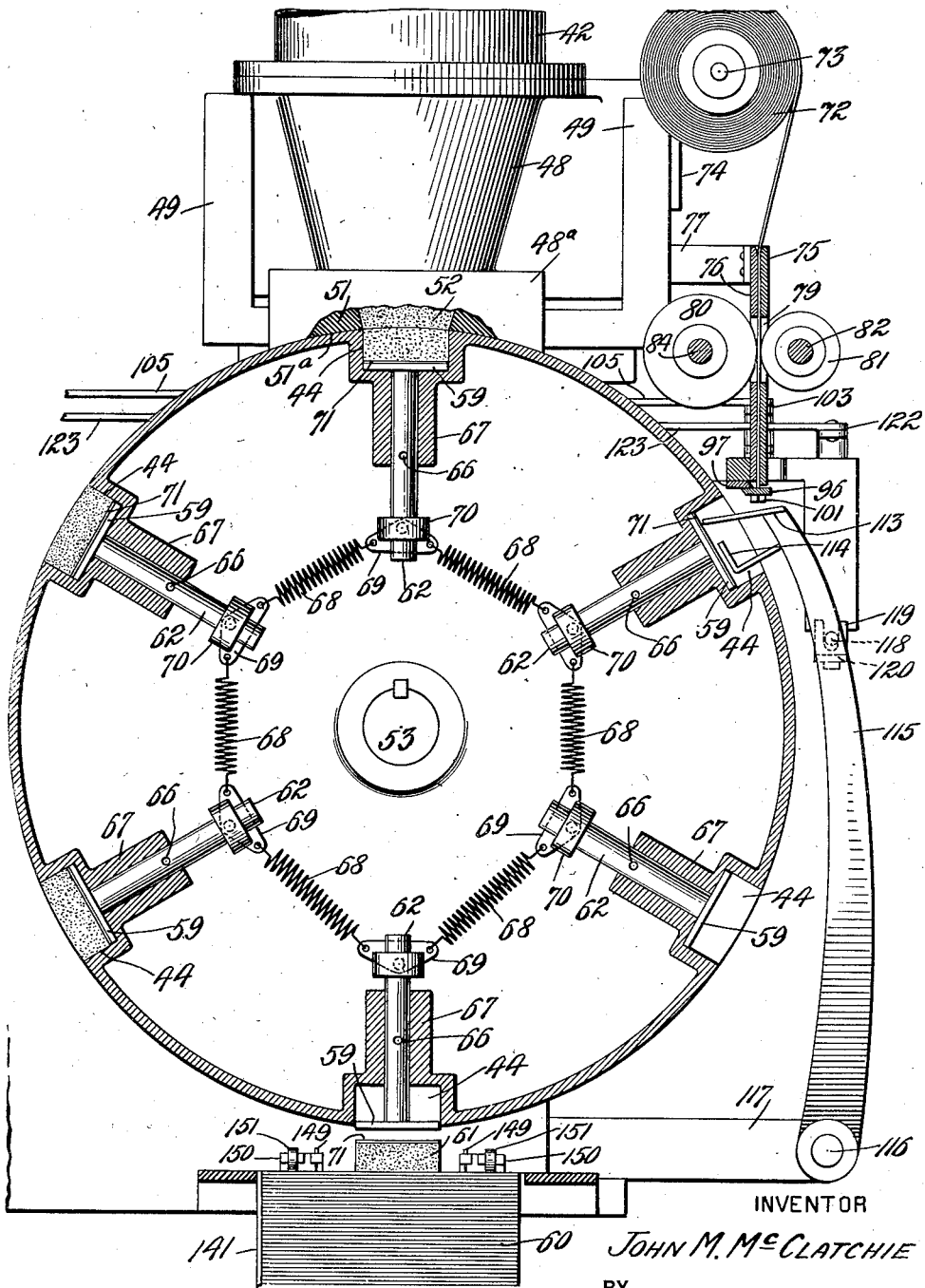

Aug. 6, 1935.  J. M. McCLATCHIE  2,010,524
MACHINE FOR MOLDING PLASTIC MATERIALS
Original Filed Sept. 23, 1932  6 Sheets-Sheet 1
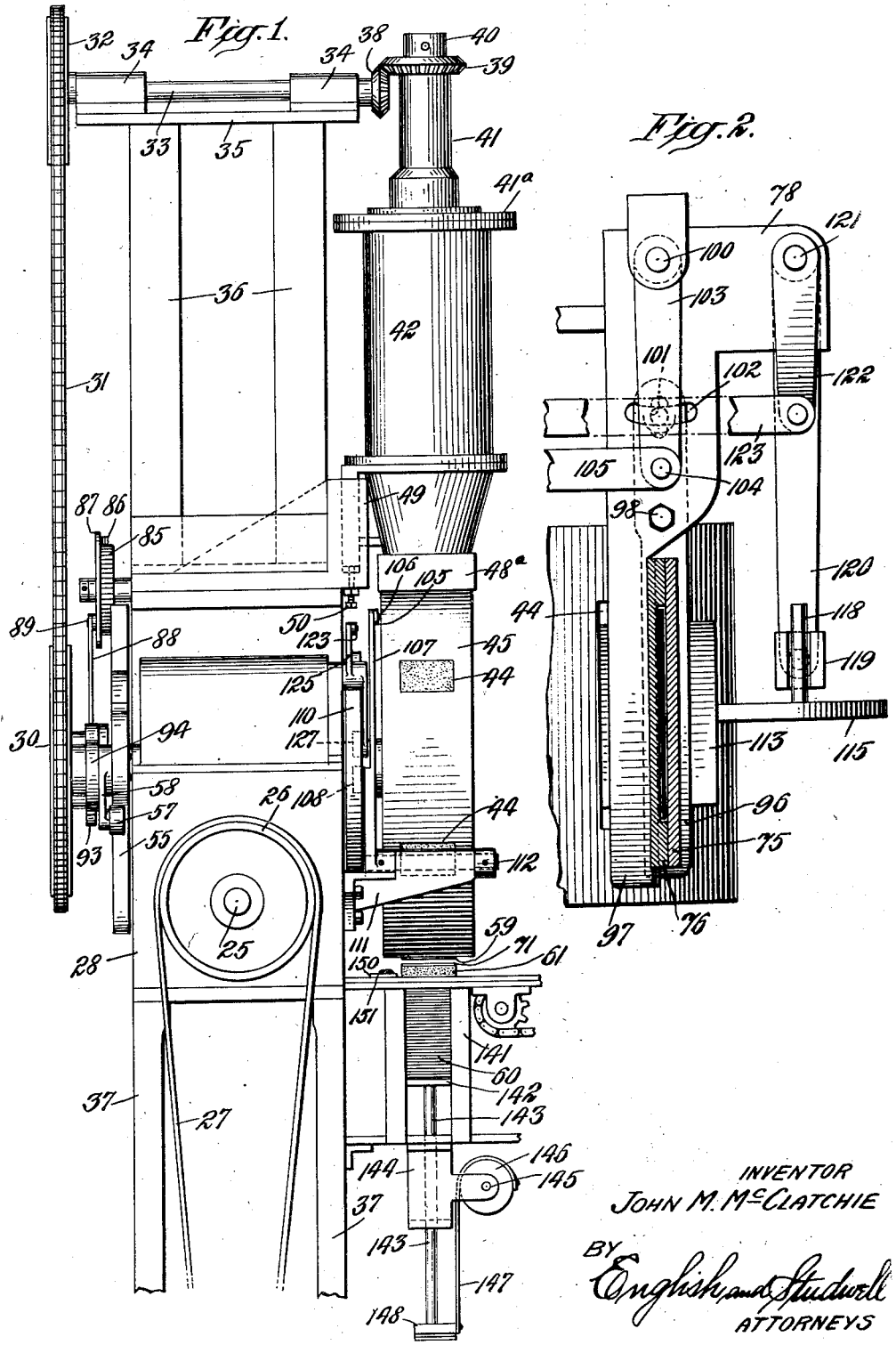
INVENTOR
JOHN M. McCLATCHIE
BY English and Studwell
ATTORNEYS

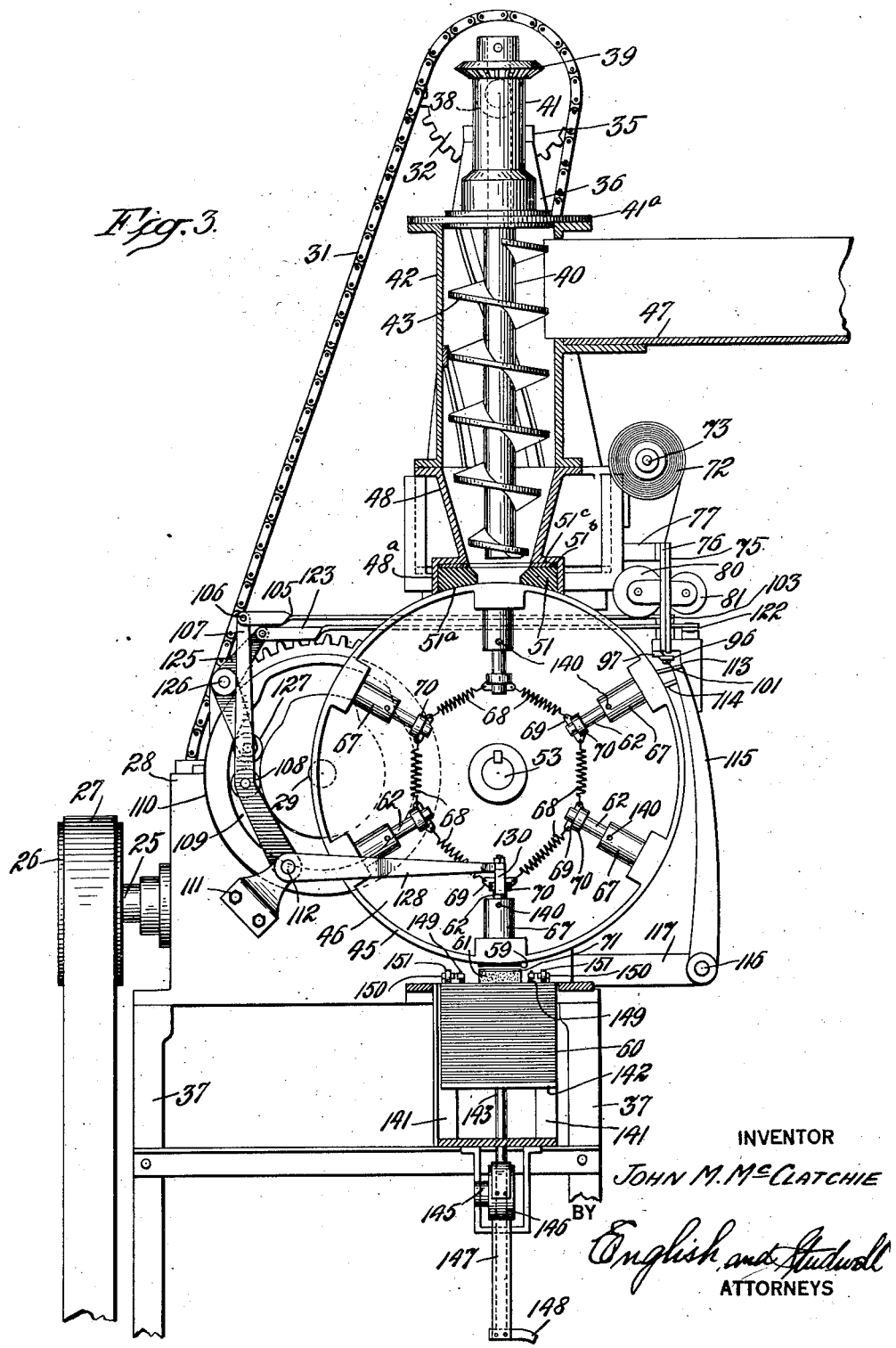

Aug. 6, 1935.  J. M. McCLATCHIE  2,010,524
MACHINE FOR MOLDING PLASTIC MATERIALS
Original Filed Sept. 23, 1932   6 Sheets-Sheet 3

INVENTOR
John M. McClatchie
BY
English and Studwell
ATTORNEYS

Aug. 6, 1935.     J. M. McCLATCHIE     2,010,524
MACHINE FOR MOLDING PLASTIC MATERIALS
Original Filed Sept. 23, 1932     6 Sheets-Sheet 4
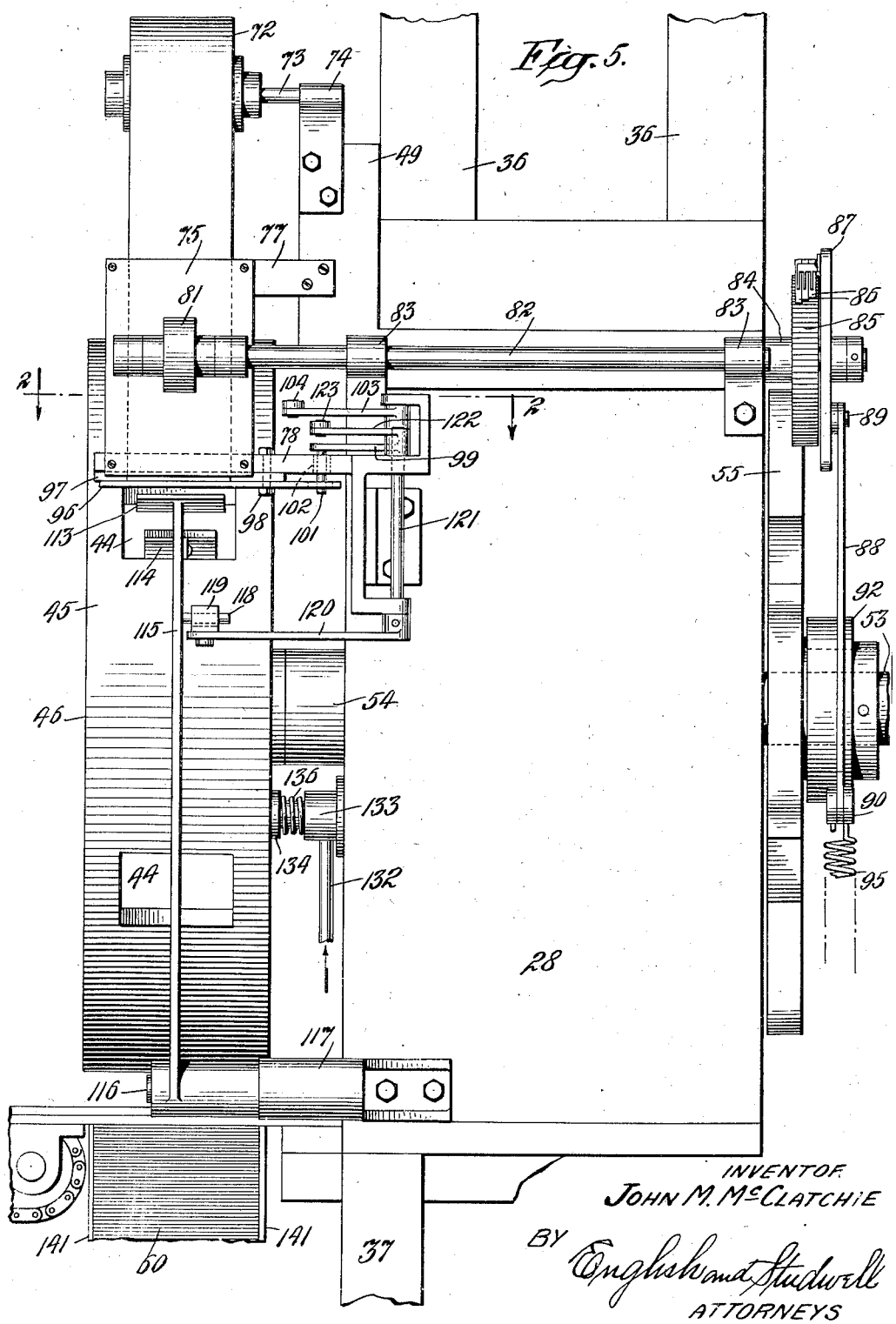
INVENTOR.
JOHN M. McCLATCHIE
BY English and Studwell
ATTORNEYS Aug. 6, 1935.   J. M. McCLATCHIE   2,010,524
MACHINE FOR MOLDING PLASTIC MATERIALS
Original Filed Sept. 23, 1932   6 Sheets-Sheet 5
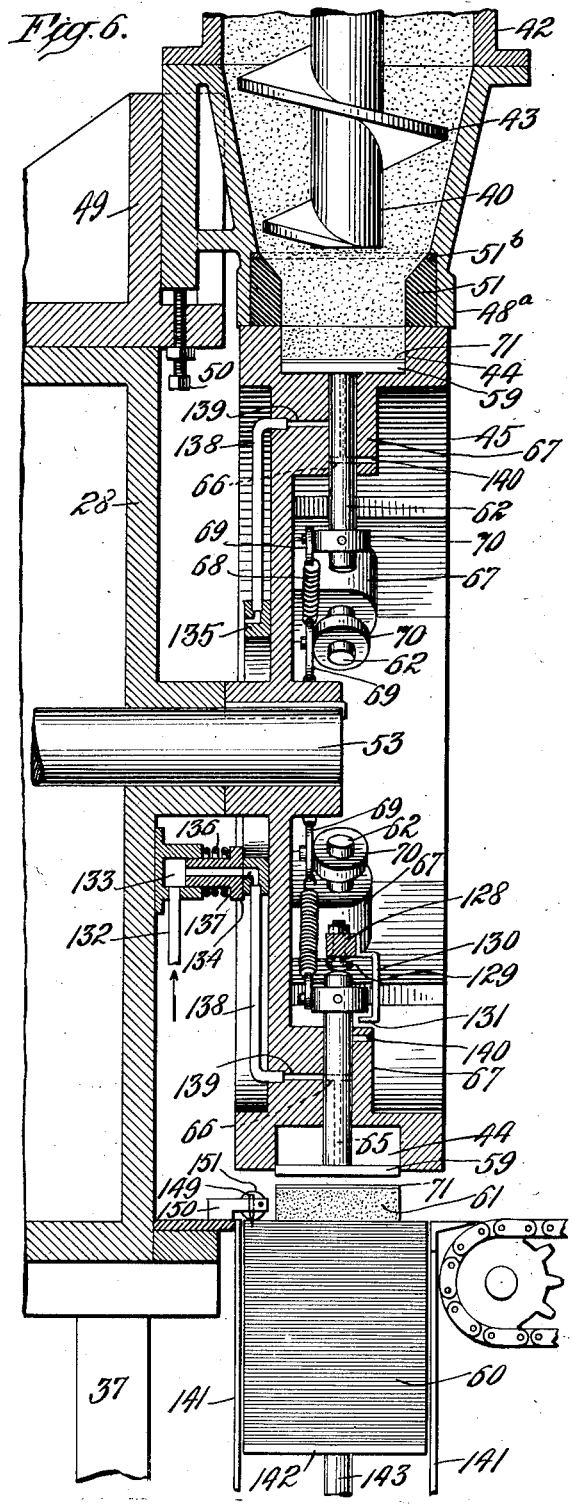
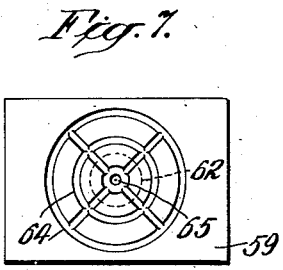
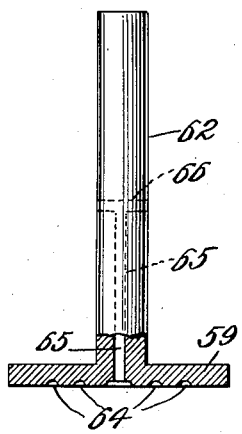
INVENTOR
JOHN M. McCLATCHIE
BY
English and Studwell
ATTORNEYS Aug. 6, 1935.   J. M. McCLATCHIE   2,010,524
MACHINE FOR MOLDING PLASTIC MATERIALS
Original Filed Sept. 23, 1932   6 Sheets-Sheet 6
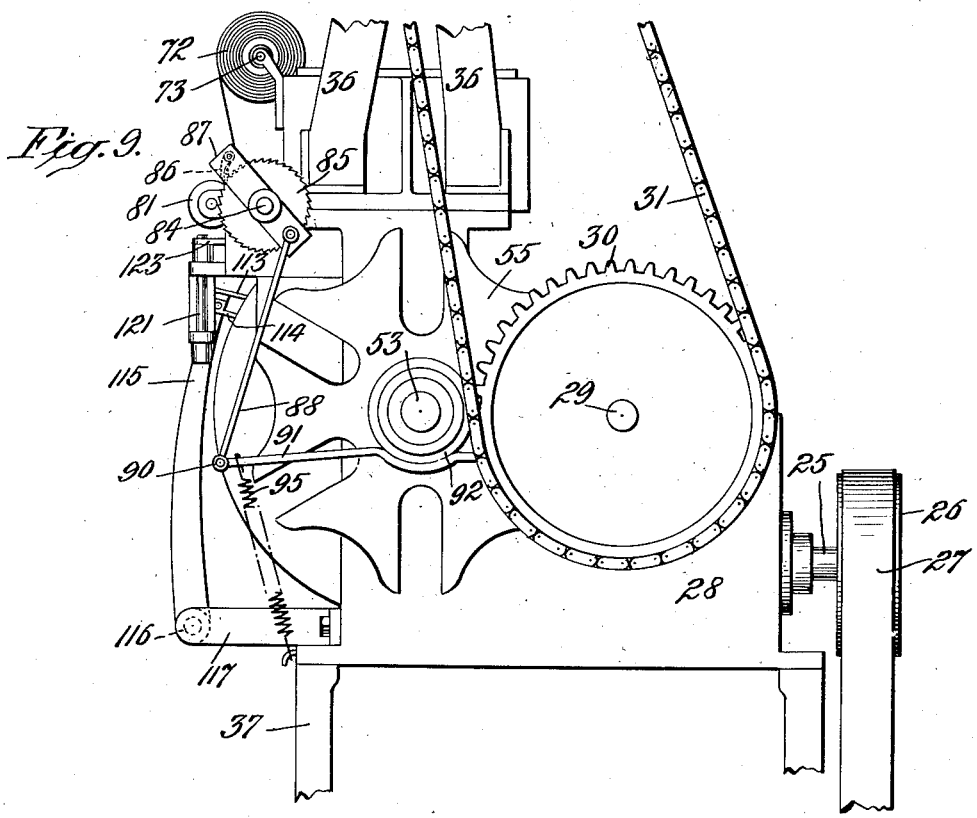
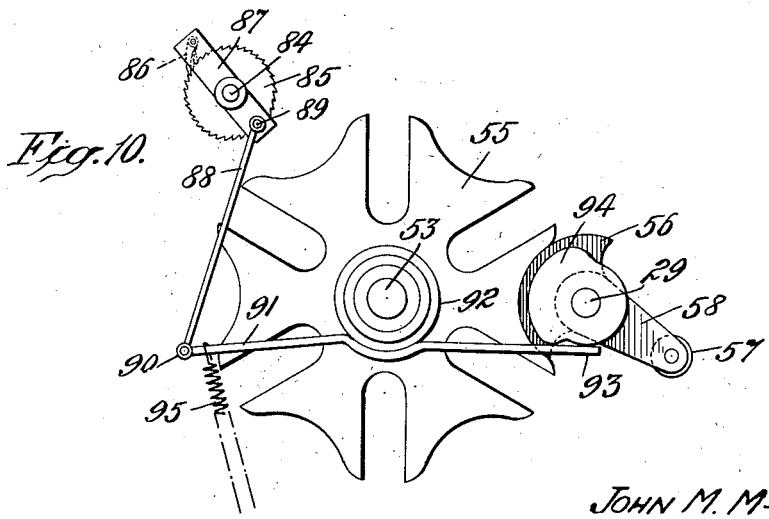
INVENTOR
JOHN M. McCLATCHIE
BY
English and Studwell
ATTORNEYS Patented Aug. 6, 1935

2,010,524

UNITED STATES PATENT OFFICE 2,010,524

MACHINE FOR MOLDING PLASTIC MATERIALS

John M. McClatchie, New York, N. Y., assignor to The Borden Company, New York, N. Y., a corporation of New Jersey Original application September 23, 1932, Serial No. 634,521. Divided and this application August 9, 1933, Serial No. 684,316

13 Claims. (Cl. 31—10)

This invention relates to an apparatus for forming or molding into cakes relatively soft or plastic materials, such as cream cheese or other relatively soft cheese, mince-meat or the like, so that the same may be easily wrapped or packed.

This application is a division of my copending application, Serial No. 634,521, filed September 23, 1932.

One object of the invention is to provide an improved apparatus operating entirely automatically for forming the cakes from a mass of the plastic material and delivering them successively onto a wrapper or onto a support of any desired character. The improved apparatus is provided with an intermittently rotated drum in the periphery of which are molds or recesses for receiving cheese or other soft material from a hopper and forming it into cakes, and with means for delivering the cakes of material successively to the uppermost wrapper in a stack of wrappers. Prior to introducing the material into each mold recess, a paper sheet or lining is inserted in the recess, so that when the formed cake of soft material is delivered from the mold recess, the paper lining will lie on top of the cake. Another object of the invention is to provide the molding apparatus with improved means for preventing leakage between the hopper for containing the mass of plastic material and the periphery of the drum, so that the periphery of the drum will be kept clean and free of the material being molded. To this end the hopper discharges into the molds through a block of soft metal, preferably pure tin, having an inner face shaped in conformity with the curve of the periphery of the drum. The block of soft metal is yieldingly held against the drum, and since the two contacting metal surfaces are carefully machined, there is substantially no leakage between them and no "gumming up" of the machine at this point. A further object of the invention is to provide the molding machine with improved means for ejecting the cakes of molded material from the molds in the drum. In addition to the usual plunger used in ejecting the material from the mold, a blast of compressed air is directed against the inner face of the sheet of paper or liner in the bottom of the mold, thereby assuring that there will be no adherence of the paper to the face of the plunger as the material is discharged from the mold.

For the purpose of simplicity of description the substance which is molded by the improved apparatus is herein referred to as "cheese", it being understood, however, that the mechanism herein described is applicable for use in connection with the molding and shaping of almost any other soft, plastic substance, difficult, if not impossible, to mold by structures in general use at the present time for molding materials of a different nature.

In the accompanying drawings wherein the preferred embodiment of the invention is shown, Fig. 1 is a side elevation of the improved machine for molding the cheese into cakes and delivering the cheese to the wrapper stack; Fig. 2 is a sectional view on the line 2—2 of Fig. 5, looking in the direction of the arrows; Fig. 3 is a view of the molding machine taken at right angles to Fig. 1, with certain parts shown in section; Fig. 4 is a vertical sectional view through the rotating mold drum and associated parts; Fig. 5 is a side elevation of the parts shown in Fig. 4, looking from the right of Fig. 4; Fig. 6 is a vertical sectional view through the mold drum and associated parts taken at right angles to Fig. 4; Fig. 7 is a view of the channelled face of one of the plungers which ejects the cakes of cheese from the mold recesses; Fig. 8 is a side elevation of the plunger shown in Fig. 7, with the head of the plunger shown in section; Fig. 9 is a rear view of a part of the driving mechanism; and Fig. 10 is a view of the Geneva gear movement for intermittently rotating the mold drum, and showing also the mechanism for intermittently feeding the paper liner which is cut into sheets and inserted in the mold recesses.

In the operation of the machine, cheese or other soft material is fed from a hopper into mold recesses which form the cheese into cakes to be wrapped. The hopper in which the cheese is received is shown at 42. Within the hopper is located a spiral vane 43 which is rotated to direct the cheese downwardly and into mold recesses 44, provided in the peripheral flange 45 of a drum 46 which is intermittently rotated.

The drive shaft from which the feeding vane 43 and other mechanism is driven is indicated at 25, a pulley 26 being secured thereon and driven by a belt 27 extending from a motor or other suitable source of power. The shaft 25 drives reducing gearing, not shown in detail since it is of conventional arrangement, but contained within the casing 28 supported on the frame standards 37 clearly shown in Figs. 1, 3, and 9. A shaft 29 is continuously driven by the reducing gearing contained in the casing 28. On the shaft 29 is a sprocket 30 driving a chain 31 extending upwardly and about a sprocket 32, secured at the end of a shaft 33, mounted in bearings 34, supported on a plate 35 located at the upper end of uprights 36 forming a part of the frame of the machine. At the opposite end of the shaft 33 is secured a bevel gear 38 which meshes with and drives a bevel gear 39 secured at the upper end of a vertical shaft 40 on which the vane 43 is formed. The shaft 40 is mounted in a bearing 41 supported on a plate 41a and extends downwardly within the hopper 42.

The cheese or other material to be molded is delivered in bulk from a table or other like support 47 into the hopper 42 where it is directed downwardly into the mold recesses 44 by the spiral feeding member or vane 43 during pauses in the intermittent rotation of the drum 46.

At its lower end, the hopper 42 is provided with a contracted or conical portion 48 supported in a bracket 49 on the casing 28, and in which the portion 48 is vertically adjustable by means of the screws 50. At the lower end of the conical portion 48 of the hopper is a chamber 48a in which is located a member or block 51 having a central opening 52 adapted to align with each of the mold recesses 44 in the drum 46 to permit the accurate direction of the cheese into them.

The member 51 is preferably made of soft metal, such as block tin, and has its lower curved face 51a (Fig. 3) resiliently held against the face of the peripheral flange 45 by the pressure of a rubber washer 51b (Fig. 3) located between the shoulder 51c of the chamber 48a and the upper face of the member 51. Through this arrangement, the under curved face 51a of the member 51 is held in constant close contact with the face of the peripheral flange 45 of the drum and the possibility of cheese from the hopper getting between the member 51 and the periphery of the drum is prevented.

The drum 46 is secured upon a shaft 53 rotatably mounted in bearings 54 extending from the casing 28. The shaft 53 is intermittently driven by means of a Geneva gear movement of which the slot-wheel 55 is shown in detail in Fig. 10. The wheel 55 is so shaped and slotted that the drum 46 will, during each pause in its rotative movement, align one of the mold recesses 44 with the opening 52 in the member 51 to receive cheese from the hopper. The wheel 55 is driven by the shaft 29 on which is an interrupted disk 56 and projecting arm 58 which carries a roller 57, the disk and roller cooperating with the wheel 55 in the manner well understood to drive it intermittently and impart an intermittent motion to the shaft 53.

Mounted for reciprocating movement in each of the mold recesses 44 is a plunger 59 (Fig. 8), which ejects the cakes of cheese from the molds and successively deposits them upon the top wrapper in a stack indicated at 60. In place of a stack of wrappers a support of any kind may be used. A cake of cheese so deposited on the uppermost wrapper in the stack, is indicated at 61 in Figs. 1, 4, and 6. The construction of each of the plungers 59 is shown in detail in Figs. 7 and 8 where it will be seen that it comprises a stem 62 provided with an integral or attached head or plate member. The head of each plunger is so shaped that it closely fits the interior of its mold recess 44. The head has its outer face formed with air channels 64 connecting with an axial air passage 65 extending through the stem 62 for a part of its length, the end of the passage 65 joining a transverse port 66 extending through the stem.

Each of the plungers 59 is mounted for reciprocation in a boss 67 formed on the drum 46. The plungers 59 are normally held in retracted position in the mold recesses, as shown in Fig. 4 (where all of the plungers except the lowermost one are in their retracted position), by means of the springs 68, which extend between and attach to plates 69 pivoted on collars 70, one of which is secured to each plunger stem 62.

The drum 46 is intermittently rotated in a counter-clockwise direction, as viewed in Figs. 3 and 4, and before each mold recess 44 is brought into position in register with the hopper outlet for filling, a paper liner or sheet 71 is inserted in the mold recess and brought to rest against the face of the plate or head of the plunger located therein, one of the functions of this sheet being to prevent the cheese from contacting with and sticking to the face of the plunger. These paper sheets or liners 71 are successively cut from a roll 72 and are inserted into each mold when the latter is located beneath the roll 72 during pauses in the intermittent rotary movement of the drum 46.

The roll of paper 72 is mounted on a stud 73 secured in a lug 74 attached to and projecting from the bracket 49. Paper drawn from the roll 72 extends downwardly between a pair of guide plates 75, 76 supported by brackets 77 and 78, the plates being apertured at 79 to permit feeding rolls 80 and 81 to engage the paper between them and move it downwardly with an intermittent movement. The roll 81 is an idle roll and is supported on a shaft 82 mounted in the bearings 83. Roll 80 cooperating with the roll 81 to feed the paper, is driven with an intermittent motion by means of the mechanism shown in Fig. 10. The roll 80 is secured on the end of shaft 84, and attached on the shaft adjacent its opposite end is a ratchet wheel 85 engaged and rotated by pawls 86 carried by the oscillating arm 87 loosely mounted on shaft 84. The required oscillating movement is imparted to the arm 87 by means of a link 88 having one of its ends connected at 89 to one end of the arm 87 and its opposite end connected at 90 to a lever 91 which is attached to a collar 92 loosely mounted on the shaft 53. The free end 93 of the lever 91 is operated upon by a cam 94 secured on the shaft 29. Oscillating or rocking movements imparted to the lever 93 by the cam 94 are communicated to the arm 87 by the link 88, causing the pawls 86 to turn the ratchet wheel and thus rotate the roller 80 for a required distance so that it, in cooperation with the roller 81 feeds a section of paper of required length downward between the guide-plates 75 and 76 in timed relation with the intermittent rotation of the drum 46. A spring 95 holds the end 93 of the lever 91 against the cam 94.

The paper fed from the roll 72 after passing between the guide plates 75 and 76, is severed into lengths to form the sheets 71 by means of a cutting device composed of two blades 96 and 97. In Fig. 2 the cutting device is shown in enlarged detail. The blade 97 is fixed to or forms a part of the supporting bracket 78, the blade 96 being pivoted at 98 on the bracket 78 and having a shearing movement relative to the fixed blade 97 so that it cooperates therewith to sever the paper strip passed between the blades. The shearing movement is imparted to the blade 96 by means of an arm 99 (Fig. 5) pivoted at 100 (Fig. 2) in the bracket 78. At its free end the arm 99 is provided with a pin 101 which extends downwardly through a transverse arcuate slot 102 formed in the bracket 78 and is loosely received in an axial slot in the end of the movable cutting blade 96. An arm 103 mounted on the pivot pin 100 is connected to the hub of the arm 99 so that an oscillatory movement of the arm 103 will likewise oscillate the blade-operating arm 99. The free end of the arm 103 is connected to one end of a link 105 the other end of which is connected at 106 to the upper end of a cam lever 107 carrying a cam roll 108 movable in a cam groove 109 formed in a cam 110 secured on the continuously driven shaft 29. The cam lever 107 is fixed to a pivot pin 112 journaled in a bracket 111 secured to the casing 28. The lever 104 being oscillated from the cam 110 and connected elements, causes the knife-operating lever 99 to impart an oscillatory or shearing movement to the blade 96 which cooperates with the fixed blade 97 to cut off a section 71 of the paper from the roll 72.

When the cutting of the paper occurs, one of the mold recesses 44 is so positioned relative to the cutting knife that the severed paper strip is directed into the mold, and is positioned therein against the face of the plunger head by members 113 and 114 located at the upper end of an oscillatory arm 115. At its lower end, the arm 115 is pivoted at 116 on a bracket 117 secured to the casing 28. The arm 115 is provided with a projecting pin 118 (Fig. 5) received in a yoke 119 located at the free end of an arm 120 secured to the lower end of a pivot pin 121 mounted in an extension of the bracket 78. Fixed on the upper end of the pin 121 is an arm 122 having its end pivotally attached to a link 123 connected to the upper end of a cam lever 125 mounted at 126 and carrying a roll 127 located in the groove 109 of the cam 110. As a paper sheet or liner 71 is severed it is engaged by the fingers 113 and 114 and inserted in the mold recess 44 then adjacent to the cutters and is placed against the surface of the plunger head located therein. Consequently, when each of the molds is brought to position below the hopper for filling, the cheese forced into the mold recess is deposited therein on top of the liner 71 previously inserted.

The filled mold recesses are successively brought to a position above the wrapper stack 60 and the cakes of cheese formed in the mold recesses and indicated at 61 are there ejected together with the paper 71, as clearly shown at the lower portion of Fig. 4; the cake and paper so ejected being deposited upon the uppermost wrapper of the stack. The ejection of the cakes is effected by lever 128 fixed to the pivot pin 112 and provided at its free end with an adjustable tappet 129 (Fig. 6), which is brought into contact with the end of the stems 62 of the respective plungers to force the plunger head out of the mold to cause it to eject the cake of cheese 61. The lever 128 is oscillated by the pivot pin 112 through the cam lever 107. A bracket 130 formed with an inturned end 131 (Fig. 6) is secured on the lever 128, the inturned end of the bracket contacting with and drawing upwardly on the collar 70 on the upward movement of the lever 128, to aid the springs 68 in drawing the plunger back into the mold to its retracted position after it has ejected the cake of cheese.

To aid in freeing the paper-covered upper face of the cake of cheese from its adherent engagement with the face of the plunger as the plunger deposits the cake on the stack of wrappers, an air blast is used. The air blast may be obtained from any suitable source, not shown, and is delivered through a tube 132 connected to a boss 133 mounted on the casing 28 as shown in Fig. 6. A nipple 134 slidingly mounted in the boss 133 has one of its ends resiliently held by a spring 136 against the face of an annulus 135 secured on the back of the drum 46. Spaced ports 137 are provided in the annulus, and leading from each of these ports is a tube 138 which connects a port 137 with a port 139 provided in each of the bosses 67 of the drum 46. When one of the ports 137 is in register with the nipple 134 an air blast delivered therethrough will pass through the connected tube 138 to the corresponding port 139. The nipple 134 is so positioned relative to the molds on the drum that the air blast is directed through the boss 67 of the lowermost mold, that is, that mold which is positioned over the wrapper stack and has forced a cake of cheese out of the mold.

When the plunger moves out of the mold, as shown in Fig. 6, the cake of cheese usually falls by gravity upon the uppermost wrapper in the stack. To insure the delivery of the cake of cheese on the wrapper stack and to prevent any possible adherence between the cake 61 and sheet 71 and the face of the plunger, the air blast is exerted through the plunger when it has reached the limit of its downward movement out of the mold. When the plunger reaches this position, by the downward pressure of the lever 128, the transverse port 66 in that plunger stem is brought into register with the port 139 in the boss 67. The air blast directed through the plunger stem and through the channels 64 in the plunger, acts against the sheet 71 and assures the deposition of the cake of cheese and the sheet 71, with the paper sheet uppermost, on the top wrapper in the stack 60.

The bosses 67 are also provided with exhaust ports 140 which are so positioned relative to the transverse ports 66 in the plunger stems 62 that when the plungers are in their retracted positions in the mold recesses, the ports 66 in the plunger stems are in register with the ports 140 in the bosses, as indicated in the upper portion of Fig. 6. Consequently, when the cheese is forced from the hopper and into the mold then positioned beneath it, the air displaced from that mold by the entry of the cheese therein is exhausted through the connected ports 65, 66 and 140.

The wrappers contained in the stack 60 are made of foil, paper, or other material suitable for the purpose of enclosing and protecting the cheese. These wrappers are larger in size than the cakes of cheese deposited on them so that when a cake of cheese is received upon a wrapper held flatwise in the stack, there are lateral edge portions on the wrapper extending beyond the sides and ends of the cake, these lateral edge portions being later folded about the cake by wrapping means. The stack of wrappers is held between vertical guides 141 and is forced upward by a follower plate 142 having a dependent stem 143 vertically guided in a bracket 144. A lug 145 extending from the bracket, supports a roller 146 which is under the torsional pull of a contained spring, and which tends to draw upward on a strap 147 having one of its ends attached to the peripheral face of the roller 146 and its other end attached to a plate 148 secured to the lower end of the stem 143. By this mechanism the wrappers in the stack 60 are constantly elevated so that the uppermost wrappers therein are held against pins 149 which penetrate through several wrappers in the upper part of the stack. These pins are supported in members 150 secured on a fixed part of the machine frame and positioned to overlie the wrapper stack. The supporting members 150 also carry rolls 151 which rest upon the uppermost wrapper in the stack and from beneath which the wrappers are successively drawn to remove them from the stack.

While a stack of wrappers is shown for receiving successive cakes of cheese, it will be understood that the cakes may, if desired, be deposited upon any fixed or moving support from which they may be taken and boxed, wrapped, or otherwise handled.

Briefly, the operation of the apparatus is as follows:

The drum 46 which is rotated intermittently, locates one of the mold recesses 44 in position relative to the paper-cutting knives 96 and 97 each time a pause in the rotative movement of the drum occurs, so that a strip or sheet 71 cut from the paper roll 72 is delivered into the mold recess so located. The arm 115, swung toward the periphery 45 of the drum, directs the paper sheet 71 into the mold recess and positions it against the head of the plunger 59 located therein. The arm 115 is then swung away from the drum and the drum moves the mold recess, within which the paper sheet 71 has been placed, to a position beneath the hopper and in register with the opening 52 in the block 51, to be filled with cheese. In this way, each of the mold recesses receives a sheet 71 and a filling of cheese. As the drum continues its rotative movement, the filled molds are carried successively to a position above the wrapper stack 60 where each cake of cheese 60 and the accompanying paper sheet 71 is ejected from a mold recess by the action of the plunger 59 under the pressure of the lever 128, the ejection of the cheese and its separation from the plunger head being assured by the air blast directed through the ports 65 and 66 in the plunger against the sheet 71.

What I claim is:—

1. A machine of the character described provided with a hopper, an intermittently rotated mold-carrying member having mold recesses for receiving material from the hopper and forming it into cakes, a soft metal member located in the hopper, means for resiliently urging said soft metal member against the periphery of the mold-carrying member, the soft metal member being provided with an aperture through which material is forced from the hopper, a roll of paper and means for supporting the same, means for intermittently feeding the paper from the roll, cutting means for severing successive paper sheets from the roll, a swinging arm carrying means for positioning a sheet of paper in each of the mold recesses before it is filled with material from the hopper, a plunger operative in each mold recess for ejecting the contents in cake form from the mold recess together with the paper sheet previously placed therein, and a support on which the ejected cakes and sheets are successively received.

2. In a machine of the class described, a hopper, a mold-carrying member mounted to rotate relative to the hopper, mold recesses provided in the mold-carrying member adapted to be filled with material from the hopper, a plunger mounted in each of the mold recesses, means for normally retracting the plungers within the mold recesses, each of the plungers having a stem formed with an air passage, a portion of said air passage extending transversely through the stem, means for successively forcing each plunger out of its mold recess to cause the contents of the mold recess to be ejected, means for forcing an air blast through the air passage in the plunger stem and against the cake when the plunger is forced out of its mold recess, plunger guides located on the mold-carrying member, and ports in the plunger guides adapted to register with the transverse portions of the air passage in each plunger stem while the plungers are in their retracted positions to permit air expulsion while the mold recesses are being filled.

3. In a machine of the character described, a hopper provided with an outlet opening, means in the hopper for feeding the contents of the hopper out of the outlet opening, a rotary mold-carrying member positioned relative to the hopper opening to receive hopper contents, a peripheral flange on the mold-carrying member, an apertured block disposed in the hopper outlet opening and provided with a curved face in contact with the flange, resilient means for urging the block against the flange, molds on the mold-carrying member, means for feeding a paper sheet into each of the molds before the mold is filled from the hopper, a support and means for ejecting each cake and paper sheet from each mold so that the cake is received on the support with the paper sheet positioned on top of it.

4. In a machine of the character described, a hopper provided with a conical outlet opening for containing plastic material, an enlarged chamber extending from the conical opening and provided with shoulder portions, a soft metal block disposed in the chamber, a rotary mold-carrying member positioned relative to the hopper to receive hopper contents, an apertured peripheral flange formed on the mold-carrying member, the block having a curved face in contact with the flange, a resilient washer located between the shoulder portions and the block for resiliently urging the block against the flanges, means on the mold-carrying member for forming the material received from the hopper into cakes, and means for ejecting the cakes.

5. In a machine of the character described, a hopper for containing plastic material and provided with an outlet opening, a rotary mold-carrying member having a peripheral flange in which the molds are located, said flange being positioned adjacent the outlet of the hopper, an apertured block of soft metal located in the outlet of the hopper, said block having a face formed to make a snug fit with the peripheral flange and means for urging the block against the flange.

6. In a machine of the character described, a hopper provided with an outlet opening for containing plastic material, shoulder portions surrounding the opening, a soft metal block disposed in the hopper outlet opening, a rotary mold-carrying member positioned relative to the hopper opening to receive hopper contents, a peripheral flange formed on the mold-carrying member, the block having a curved face in contact with the flange, resilient means located between the shoulder portions of the hopper and the block for urging the block against the flange, and molds on the mold-carrying member for forming the material received from the hopper into cakes.

7. In a machine of the character described, a hopper provided with a contracted outlet opening for containing plastic material, an intermittently operated rotary mold-carrying member movable relative to the hopper and provided with an apertured peripheral flange, a tubular soft metal member located in the outlet opening of the hopper, means behind the tubular soft metal member for resiliently directing it against the face of the peripheral flange on the mold-carrying member, means for inserting paper sheets in the apertures in the mold-carrying member, and means for forcing the hopper contents into said apertures on top of the sheets therein to form the material into cakes.

8. In a machine for molding plastic material including an intermittently rotating member having mold recesses in its periphery, means located above the mold-carrying member for filling the molds successively with plastic material and plunger means for ejecting the molded material from the molds, means for inserting a sheet of paper in each mold previous to the filling thereof, said means comprising means for supporting in vertical position a strip of paper with its lower end opposite the empty mold next to be filled, means for cutting a sheet from the end of the strip of paper, and means for pushing the severed sheet into the mold.

9. In a machine for molding a plastic material including an intermittently rotating drum having a plurality of mold recesses in its periphery, means located above the drum for filling the uppermost mold recess with plastic material while the drum is stationary and plunger means for ejecting the molded material from the mold, means for inserting a sheet of paper in the empty mold recess following the mold being filled, said means comprising means for supporting in vertical position a strip of paper with its lower end opposite the empty mold next to be filled, means for cutting off a sheet of paper from the strip and means for pushing the severed sheet into the mold.

10. In a machine for molding plastic material including a rotary mold-carrying member having a peripheral flange in which the molds are located, a hopper for containing plastic material located adjacent the mold-carrying member and having an outlet opening adapted to register with the molds successively, an apertured block of pure tin located in the outlet of the hopper, the aperture in said block of tin being of the same shape and size as the molds, said block having a face formed to make a snug fit with the peripheral flange, and means for ejecting the block against the flange.

11. In a machine for molding plastic material, a rotary drum having mold recesses in its periphery, a plunger in each mold having air channels in its face and having a stem provided with a passageway communicating with the channels, means for reciprocating the plunger in the molds, means for feeding plastic material into the molds, means for placing a sheet of paper against the channel face of each plunger previous to the filling of its respective mold, the machine having an orifice communicating with a source of air under pressure, and air passageways on the drum corresponding to the plungers and arranged to connect the orifice and the passageway of a plunger when the latter has ejected a cake of molded material.

12. In a machine for molding plastic material, a hopper, a mold-carrying member mounted to rotate relatively to the hopper, mold recesses provided in the mold-carrying member adapted to be filled with material from the hopper, a plunger mounted in each of the mold recesses, means for normally retracting the plungers within the mold recesses, each of the plungers having a stem formed with an air passage, a portion of said air passage extending transversely through the stem, means for successively forcing each plunger out of its mold recess to cause the contents of the mold recess to be ejected, means for forcing an air blast through the air passage in the plunger stem and against the cake when the plunger is forced out of its mold recess, plunger guides located on the mold-carrying member provided with ports, and an air passageway on the drum arranged to communicate with the source of air under pressure when a plunger is in ejecting position, the transverse passage in the stem of the plunger in ejecting position registering with the port of its plunger guide when the plunger has ejected the plastic material from the mold.

13. In a machine for molding plastic material, a hopper having a discharge opening, a rotary drum located adjacent the opening of the hopper, mold recesses in the periphery of the drum adapted to register with the hopper opening, a plunger mounted in each mold, means for reciprocating the plunger in the molds, each plunger having a stem formed with an air passage, a portion of said air passage extending thansversely through the stem, and plunger guides located on the mold-carrying member provided with ports adapted to register with the transverse portions of the air passage in each plunger while the plungers are in their retracted positions in the molds to permit air expulsion while the molds are being filled.

JOHN M. McCLATCHIE.